United States Patent
Bartkowiak et al.

(10) Patent No.: US 10,734,005 B2
(45) Date of Patent: Aug. 4, 2020

(54) METHOD OF ENCODING, METHOD OF DECODING, ENCODER, AND DECODER OF AN AUDIO SIGNAL USING TRANSFORMATION OF FREQUENCIES OF SINUSOIDS

(71) Applicant: ZYLIA SPOLKA Z OGRANICZONA ODPOWIEDZIALNOSCIA, Poznan (PL)

(72) Inventors: Maciej Bartkowiak, Poznan (PL); Tomasz Zernicki, Poznan (PL); Lukasz Januszkiewicz, Jastrowie (PL); Marcin Chryszczanowicz, Poznan (PL)

(73) Assignee: ZYLIA SPOLKA Z OGRANICZONA ODPOWIEDZIALNOSCIA, Poznan (PL)

( * ) Notice: Subject to any disclaimer, the term of this patent is extended or adjusted under 35 U.S.C. 154(b) by 154 days.

(21) Appl. No.: 15/544,341

(22) PCT Filed: Jan. 18, 2016

(86) PCT No.: PCT/IB2016/050222
§ 371 (c)(1),
(2) Date: Jul. 18, 2017

(87) PCT Pub. No.: WO2016/116844
PCT Pub. Date: Jul. 28, 2016

(65) Prior Publication Data
US 2018/0018978 A1    Jan. 18, 2018

(30) Foreign Application Priority Data
Jan. 19, 2015  (PL) ........................................ 410945

(51) Int. Cl.
*G10L 19/20* (2013.01)
*G10L 19/02* (2013.01)
(Continued)

(52) U.S. Cl.
CPC .............. *G10L 19/02* (2013.01); *G06F 17/14* (2013.01); *G10L 19/005* (2013.01);
(Continued)

(58) Field of Classification Search
CPC ....... G10L 19/20; G10L 19/02; G10L 19/005; G10L 19/008; G10L 21/0208; G10L 19/12; G06Q 10/087
(Continued)

(56) References Cited

U.S. PATENT DOCUMENTS 4,885,790 A    12/1989  Macaulay et al.
5,786,764 A *  7/1998  Engellenner ......... G06Q 10/087
                                                    340/572.4
(Continued)

OTHER PUBLICATIONS

European Patent Office, International Searching Authority, International Search Report for Application No. PCT/IB2016/050222, dated May 4, 2016.
(Continued)

*Primary Examiner* — Farzad Kazeminezhad
(74) *Attorney, Agent, or Firm* — SoCal IP Law Group LLP; Nikki M. Dossman

(57) ABSTRACT

The invention concerns an audio signal encoding method comprising the steps of: collecting the audio signal samples, determining sinusoidal components in subsequent frames, estimation of amplitudes and frequencies of the components for each frame, merging thus obtained pairs into sinusoidal trajectories, splitting particular trajectories into segments, transforming particular trajectories comprising of their amplitude and frequency variations to the frequency domain by means of a digital transform performed on segments longer than the frame duration, quantization and selection of transform coefficients in the segments, entropy encoding, and outputting the quantized coefficients as output data. The
(Continued)

Figure 1:
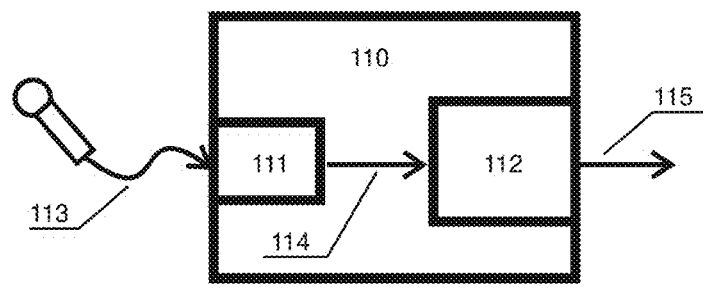

method is characterized in that the length of the segments into which each trajectory is split is individually adjusted in time for each trajectory.

14 Claims, 3 Drawing Sheets

(51) Int. Cl.
| | |
|---|---|
| *G10L 19/005* | (2013.01) |
| *G10L 19/008* | (2013.01) |
| *G10L 19/12* | (2013.01) |
| *G10L 21/0208* | (2013.01) |
| *G06Q 10/08* | (2012.01) |
| *G06F 17/14* | (2006.01) |
| *G10L 19/087* | (2013.01) |
| *G10L 19/093* | (2013.01) |
| *G10L 21/013* | (2013.01) |

(52) U.S. Cl.
CPC .......... *G10L 19/087* (2013.01); *G10L 19/093* (2013.01); *G10L 19/12* (2013.01); *G10L 2021/0135* (2013.01)

(58) Field of Classification Search
USPC ........................................................ 704/226
See application file for complete search history.

(56) References Cited

U.S. PATENT DOCUMENTS

| | | | | |
|---|---|---|---|---|
| 6,266,644 | B1* | 7/2001 | Levine | G10L 19/20 |
| | | | | 704/200.1 |
| 7,313,519 | B2* | 12/2007 | Crockett | G10L 19/02 |
| | | | | 704/226 |
| 9,111,525 | B1* | 8/2015 | Mouchtaris | G10L 19/008 |
| 2005/0114117 | A1* | 5/2005 | Kristjansson | G10L 21/0208 |
| | | | | 704/205 |
| 2007/0150272 | A1* | 6/2007 | Cheng | G10L 19/005 |
| | | | | 704/230 |
| 2009/0063161 | A1 | 3/2009 | Lee et al. | |
| 2009/0192788 | A1* | 7/2009 | Yoshioka | G10L 25/78 |
| | | | | 704/206 |

OTHER PUBLICATIONS

European Patent Office, International Searching Authority, Written Opinion for Application No. PCT/IB2016/050222, dated May 4, 2016.

European Patent Office, International Preliminary Report on Patentability for Application No. PCT/IB2016/050222, dated Apr. 25, 2017.

* cited by examiner

METHOD OF ENCODING, METHOD OF DECODING, ENCODER, AND DECODER OF AN AUDIO SIGNAL USING TRANSFORMATION OF FREQUENCIES OF SINUSOIDS

FIELD OF THE INVENTION

The invention concerns encoding and decoding of an audio signal. More specifically, the invention concerns encoding and decoding of an audio signal with a use of decomposition into sinusoidal trajectories and an entropy encoding.

BACKGROUND OF THE INVENTION

The digital uncompressed representation of a high quality audio signal (e.g. of quality comparable to the one offered by a CD record) requires large amount of data. Nowadays, encoders for reducing the amount of data before storing on data storage devices or before digital transmission are commonly used. A number of various audio signal encoders have been developed. They are presented in the scientific literature, e.g. in: K. Brandenburg, "Perceptual Coding of High Quality Digital Audio", Applications of Digital Signal Processing to Audio and Acoustics, M. Kahrs, K. Brandenburg (editors), Kluwer Academic Publishers, 1998; M. Bosi, R. E. Goldberg, "Introduction to digital audio coding and standards", Springer, 2003; and A. Spanias, V. Atti, T. Painter, "Audio signal processing and coding", Wiley 2007.

Encoders in which the frequency domain representation of an audio signal employing sub-band filters sets or block transforms is used, have gained the greatest popularity. Decoders adapted to decode signals encoded with such compression techniques are commonly used in telecommunication systems and electro-acoustic consumer devices, such as a portable music players, and usually have a form of an application specific integrated circuits. The principle of operation of such devices is also the basis for many international and commercial audio compression standards, e.g.: ISO/IEC JTC1/SC29/WG11 MPEG, International Standard ISO/IEC 11172-3, "Information Technology—Coding of Moving Pictures and Associated Audio for Digital Storage Media at up to About 1.5 Mbit/s, part 3: Audio"; ISO/IEC JTC1/SC29/WG11 MPEG, International Standard ISO/IEC 14496-3, "Coding of Audio-Visual Objects: Audio"; Advanced Television Systems Committee, Document A/52: 2010, "Digital Audio Compression Standard (AC-3, E-AC-3)"; and 3GPP TS 26.410, "General audio codec audio processing functions; Enhanced aacPlus general audio codec".

Another, less popular group of audio signal encoders and decoders are sinusoidal encoders and decoders. Sinusoidal encoders and decoders also use the frequency domain representation of a signal. In particular, representation used in the sinusoidal encoders and decoders is a weighted sum of sinusoidal components. More particularly, the instantaneous amplitudes and the instantaneous frequencies of the components, as well as the instantaneous phases related to the instantaneous frequencies, change continuously over time. Signal compression in such representation is achieved by approximating the changes of the instantaneous frequencies and the instantaneous amplitudes of the audio components by means of simple interpolation functions, such as a polynomial of low degree. It is possible to send information regarding the frequency and the amplitude of each component in intervals much longer than the sampling interval of the original signal. When reconstructing the signal, values of the instantaneous frequency and the instantaneous amplitude of each sinusoidal component for each signal sample are interpolated on a basis of the transferred data. The principle of operation of the sinusoidal encoder is described in the scientific literature, e.g. in: R. J. McAulay, T. F. Quatieri, "Speech analysis/synthesis based on a sinusoidal representation", IEEE Transactions on Acoustics, Speech, and Signal Processing ASSP-34 (4), 1986; H. Purnhagen, "Very Low Bit Rate Parametric Audio Coding", 2008; and F. Myburg, "Design of a Scalable Parametric Audio Coder", 2004. Compression method of such kind is also the basis for many international standards, such as ISO/IEC 14496-3/AMD1, "Coding of audiovisual objects—Part 3: Audio (MPEG-4 Audio Version 2) Harmonic and Individual Lines plus Noise"; ISO/IEC JTC1/SC29/WG11 MPEG, International Standard ISO/IEC 14496-3:2001/AMD2, "Sinusoidal Coding"; Compression methods of such kind are also disclosed in many patent documents.

The patent document U.S. Pat. No. 4,885,790 entitled "Processing of acoustic waveforms" concerns speech signals encoding based on a sinusoidal model. The publication describes a method and apparatus splitting a speech signal into multiple time segments. For each time segment amplitudes, frequencies and phases of sinusoidal components associated with each maximum of the speech signal amplitude spectrum are determined using the DFT (Digital Fourier Transform) block. Next the tracking algorithm merges frequencies, amplitudes and phases of the components of the current segment with the frequencies, amplitudes and phases of the components of the previous segment, basing on the smallest frequency difference. The result of the tracking algorithm is a set of sinusoidal trajectories describing the changes of the frequency, amplitude and phase of each sinusoidal component, encoded with a sampling interval many times greater than the sampling interval of the original audio signal. The trajectories are then encoded by means of known techniques, e.g. PCM (Pulse Code Modulation) or ADPCM (Adaptive Differential Pulse Code Modulation), described in L. R. Rabiner, R. W. Schafer, "Digital Processing of Speech Signals", Prentice Hall, 1978, and M. Bosi, R. E. Goldberg, "Introduction to Digital Audio Coding and Standards", Springer, 2003.

The patent document WO 03/036619 A1 entitled "Frequency-differential encoding of sinusoidal model parameters" discloses an audio signal compression method, wherein the sinusoidal components of the sound are encoded in such a way that the decoder receives either the direct representation of the frequency, amplitude, and phase of the component in the current time segment, or corresponding differences between the frequency, amplitude and phase of the component in the current time segment and the frequency, amplitude and phase of the most similar component from the previous time segment. The method includes the optimization algorithm which minimizes the total cost of transmitting the signal by selecting one of the two aforementioned ways of encoding.

The patent document U.S. Pat. No. 7,640,156 B2 entitled "Low bit-rate audio encoding" concerns a parametric audio signal encoding using three models of signal components. The document describes a method and device carrying out the decomposition of the original audio signal into components that can be approximated by a sum of pulses, modulated sine waves with slowly varying characteristics, and a noise having a spectrum that can be approximated by autoregressive filter characteristic with parameters determined by means of known linear prediction technique (LPC).

The patent document U.S. Pat. No. 7,664,633 B2 entitled "Audio coding via creation of sinusoidal tracks and phase determination" discloses an enhanced audio signal encoding method using three models of signal components approximated by a sum of pulses, modulated sine waves and a noise. The document describes a sinusoidal trajectory encoding method in which the mutual dependence of the phase and frequency was taken into account for common encoding both these information. In order to increase encoding efficiency, phase values are subjected to the second order linear prediction and only the quantized prediction error is transmitted. Since the uniqueness of the determination of the sinusoidal components' phases in the subsequent frames must be preserved, the sinusoidal trajectory tracking algorithm does not allow for tracking components exhibiting deep frequency changes over time, which results in a high trajectory fragmentation.

The main limitation of all existing known audio signal encoding methods based on sinusoidal or sinusoidal-noise model is low efficiency of the sinusoidal trajectory representation, resulting from not taking into account the long-term stability and predictability of changes in the parameters of sinusoidal components of speech and music sounds. The goal of the present invention is to solve this problem and to reduce by a factor of several times the number of bits needed to represent the signal while maintaining a good quality of the decoded signal.

SUMMARY OF THE INVENTION

A method of audio signal encoding according to the invention comprises successively performed steps of: collecting the audio signal samples, determining sinusoidal components in subsequent frames, estimation of amplitudes and frequencies of the components for each frame, merging thus obtained pairs into sinusoidal trajectories, splitting particular trajectories into segments, transforming particular trajectories to the frequency domain by means of a digital transform performed on segments longer than the frame duration, quantization and selection of transform coefficients in the segments, entropy encoding, and outputting the quantized coefficients as output data. The method is characterized in that the length of the segments into which each trajectory is split is individually adjusted in time for each trajectory.

Advantageously, the length of the segments into which each trajectory is split is determined in an optimization process, wherein the minimization of the output data rate is set as the optimization criterion.

In the step of quantization, the quantization levels are preferably selected individually for each trajectory, and more preferably they are selected for subsequent segments.

Advantageously, the number of the coefficients subjected to encoding with entropy code is adjusted individually for particular segments.

Advantageously, the sinusoidal trajectories are subjected to a nonlinear operation before they are subjected to the digital transform.

Advantageously, selected transform coefficients of the selected trajectories are replaced with at least one signal parameter, which advantageously is the energy of these coefficients. Since in the encoded trajectory the energy of the discarded coefficients is stored instead of the actual discarded coefficients, it is possible to reconstruct the trajectory taking into account an additional energy equal to the energy of the not encoded coefficients. Thus, at the expense of small amount of additional data to be transferred, it is possible to reconstruct the signal with a more natural sound, with no characteristic audible artefacts associated with reduced number of transferred transform coefficients.

The quantized coefficients are outputted in such a way that coefficients obtained from trajectories being a continuation of trajectories encoded in the previous group of segments are outputted first. As a result, it is possible to reconstruct at the decoder the continuous trajectories using no signaling indicating beginning, continuation and end of the sinusoidal trajectory. This allows obtaining better compression.

A method of audio signal decoding according to the invention comprises the steps of: retrieving encoded data, reconstruction from the encoded data digital transform coefficients of trajectories' segments, subjecting the coefficients to an inverse transform and performing reconstruction of the trajectories' segments, generation of sinusoidal components, each having amplitude and frequency corresponding to the particular trajectory, reconstruction of the audio signal by summation of the sinusoidal components. The method is characterized in that missing transform coefficients of the sinusoidal components' trajectories are replaced with noise samples generated on a basis of at least one parameter introduced to the encoded data instead of the missing, not encoded coefficients. Advantageously, the at least one parameter is the energy of not encoded coefficients. Advantageously, the not encoded coefficients are reconstructed randomly with scaling weights corresponding to a distribution specified by an additional parameter.

Advantageously, the distribution is the Poisson distribution, distinguished from other distributions by providing natural-sounding audio.

Advantageously, the trajectories are subjected to a non-linear operation inverse to the one used in the encoding process after they are reconstructed by the inverse transform.

Also advantageously, coefficients corresponding to segments continued from previous groups of segments are outputted in the order of reconstruction of the decoded segments of trajectories.

The audio signal encoder according to the invention comprises a A/D converter and a data processing unit provided with: an audio signal samples collecting unit, a determining unit receiving the audio signal samples from the audio signal samples collecting unit and converting them into sinusoidal components in subsequent frames, an estimation unit receiving the sinusoidal components' samples from the determining unit and returning amplitudes and frequencies of the sinusoidal components in each frame, a synthesis unit, generating sinusoidal trajectories on a basis of values of amplitudes and frequencies, a splitting unit, receiving the trajectories from the synthesis unit and splitting them into segments, a transforming unit, transforming trajectories' segments to the frequency domain by means of a digital transform, a quantization and selection unit, converting selected transform coefficients into values resulting from preset quantization levels and discarding remaining coefficients, an entropy encoding unit, encoding quantized coefficients outputted by the quantization and selection unit, and a data outputting unit. The encoder according to the invention is characterized in that the splitting unit is adapted to set the length of the segment individually for each trajectory and to adjust this length over time.

Advantageously, the encoder is provided with means for performing the steps of the encoding method according to the invention.

The audio signal decoder according to the invention comprises a D/A converter and a data processing unit provided with: an encoded data retrieving unit, a reconstruction unit, receiving the encoded data and returning digital transform coefficients of trajectories' segments, an inverse transform unit, receiving the transform coefficients and returning reconstructed trajectories' segments, a sinusoidal components generation unit, receiving the reconstructed trajectories' segments and returning sinusoidal components, each having amplitude and frequency corresponding to the particular trajectory, an audio signal reconstruction unit, receiving the sinusoidal components and returning their sum. The decoder according to the invention is characterized in that it further comprises a unit adapted to randomly generate not encoded coefficients on a basis of at least one parameter, the parameter being retrieved from the input data, and transferring the generated coefficients to the inverse transform unit. Advantageously, the decoder further comprises means adapted to perform the method according to the invention.

SHORT DESCRIPTION OF DRAWINGS

Figure 2:
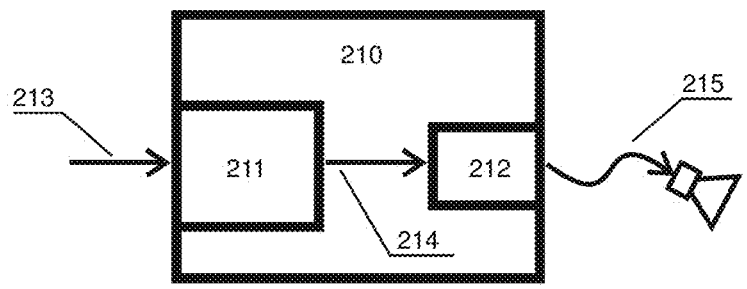
Figure 5:
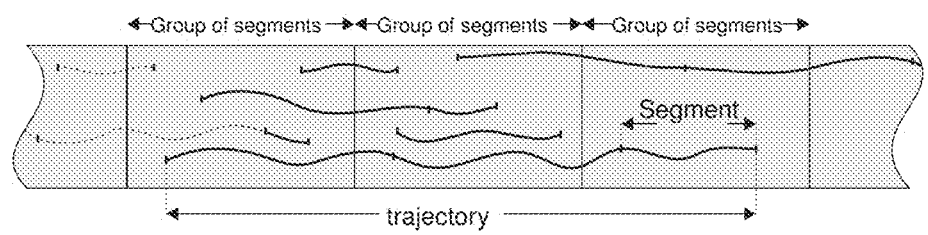
Figure 3:
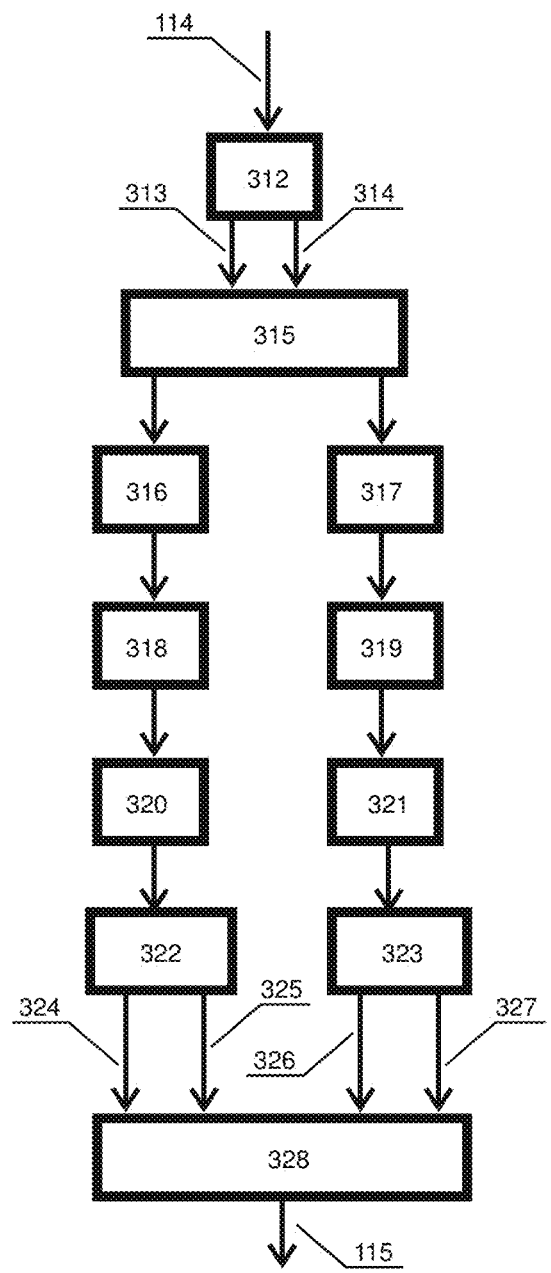
Figure 4:
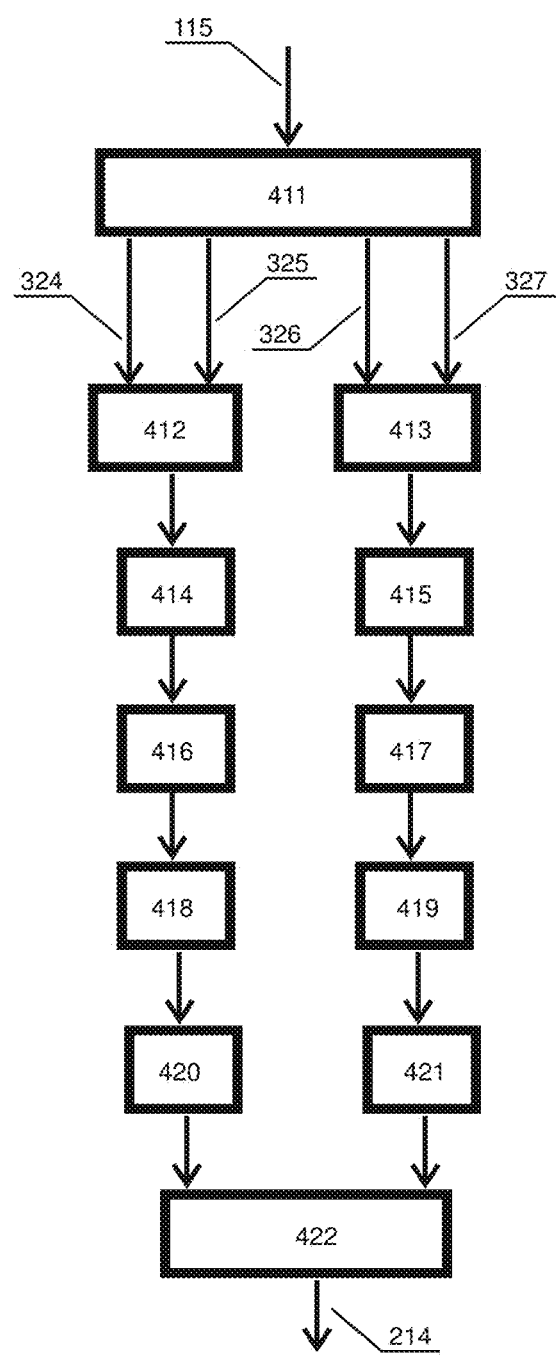

The embodiments of the present invention are illustrated in the drawing, in which FIG. 1 shows a block diagram of an encoder according to the invention, FIG. 2 shows a block diagram of a decoder according to the invention, FIG. 3 shows a flowchart of an encoding method according to the invention, FIG. 4 shows a flowchart of a decoding method according to the invention, FIG. 5 shows a distribution of trajectories' segments over frames.

DETAILED DESCRIPTIONS OF
EMBODIMENTS OF THE INVENTION

In the first embodiment the method according to the invention was implemented in an encoder according to the invention shown in FIG. 1. The encoder allows for conversion of an audio signal into a compressed data sequence, which can be stored on a storage medium or transferred via a telecommunication channel. The encoder 110 comprises an analog-to-digital converter 111, such as AD1877, receiving an analog audio signal and outputting a sequence of signal samples, and a digital signal processor arrangement 112 implemented in FPGA technology, for example using Xilinx Spartan 6, which converts samples 114 of the signal 113 into a compressed data sequence 115.

A block diagram of the decoder 210 according to the invention is shown in FIG. 2. The decoder 210 comprises a signal processing unit 211 implemented in FPGA technology, e.g. using Xilinx Spartan 6, adapted to converting compressed data 213 into digital signal samples 214. The output of the signal processor is connected to the digital-to-analog converter 212, e.g. 16-bit AD1851 converter, converting the signal samples into the analog signal 215. The output of the digital-to-analog converter 212 is connected to an external speaker which converts the analog audio signal into a sound wave.

The signal processor 112 performs encoding according to the flowchart illustrated in FIG. 3. The first processing step is to collect samples of the digital audio signal 114. Next, the step 312 of determining sinusoidal components of the sinusoidal model or the sinusoidal-noise model is performed using the digital representation of the signal. This step is performed according to known methods described in the literature: R. J. McAulay, T. F. Quatieri, "Speech Analysis/Synthesis Based on a Sinusoidal Representation", IEEE Transactions on Acoustics, Speech, and Signal Processing ASSP-34 (4), 1986; and X. Serra. J. O. Smith, "Spectral Modeling Synthesis: A Sound Analysis/Synthesis System Based on a Deterministic plus Stochastic Decomposition", Computer Music Journal, vol. 14, vo. 4, 1990. The result of the determination 312 of the sinusoidal components is an array of 313 describing frequency values of the sinusoidal components of the signal, and an array 314 describing amplitude values of these components. Phase parameters are not encoded, since the phase information is not necessary for good quality of the decoded signal. Each row of each array lists the data for one component of the signal and constitutes so called sinusoidal trajectory. Improved encoding of information on the sinusoidal trajectory as a function of time is crucial in the present invention. Particular sinusoidal trajectories are encoded independently.

For the purpose of encoding, each trajectory describing the change of frequency or the change of amplitude of the sinusoidal component is in step 315 split into segments having a length of N frames. For each segment, the frequency and amplitude values are in blocks 316 and 317 represented in the logarithmic scale, according to the formula:

$$x_{log}(n,k) = \log_a x(n,k)$$

in which $x(n,k)$ represents the amplitude or the frequency of a single signal component indicated by index k in the n-th frame, where k belongs to a range from 1 to K, n belongs to the range from 0 to N−1, and a is a selected logarithm base. A vector containing values of $x_{log}(n,k)$ corresponding to the current segment is transformed to the frequency domain by means of an orthogonal transform 318, 319, such as the discrete cosine transform known from the literature: N. Ahmed, T. Natarajan, K. R. Rao, "Discrete Cosine Transform", IEEE Transactions on Computers, vol. C-23, no. 1, pp. 90-93, January 1974; or by means of any other suitable transform returning a vector of spectral coefficients X(m,k), according to the formula:

$$X(m,k) = w_m \Sigma_{n=0}^{N-1} x_{log}(n,k) \varphi_m(n)$$

in which $\varphi_m(n)$ is a transform base function representing the m-th spectra component, m belongs to a range from 0 to N−1, and $w_m$ is a normalization factor of the function. The values of transform coefficients X(m, k) are independently quantized at the quantization step by means of quantization units 320, 321 using the quantization step size providing appropriately low frequency and amplitude error of the signal reconstructed at the decoder, for example frequency error less than 10 ct and amplitude error less than 1 dB. The quantization methods and the methods of quantization step size selection are known to those skilled in the art and described in detail for example in: L. R. Rabiner, R. W. Schafer, "Digital Processing of Speech Signals", Prentice Hall, 1978, and M. Bosi, R. E. Goldberg, "Introduction to Digital Audio Coding and Standards", Springer, 2003. A key step for obtaining a high compression ratio is the step of quantization and selection of only a few quantized coefficients X(m,k) for further encoding. Selection blocks 322 and 323 perform this step, discarding all the coefficients of absolute values below a certain threshold or arbitrarily discarding the selected number of coefficients with the smallest absolute values. In the next steps the array of indices of selected coefficients 324, 326 and the array of values of selected coefficients 325, 327 are encoded. The coefficients that are not selected, are lost. Preferably an additional parameter, ACEnergy, representing their total energy is sent instead of them. Such operation enables reconstruction at the decoder coefficients corresponding to the lost ones in such a way that the total signal energy is not changed. This is beneficial for human perception of a sound. Additional improvement can be obtained by sending information about the shape of the envelope of the lost coefficients in a form of the second parameter, which may take three values corresponding to Poisson, Gaussian or exponential function, respectively.

At the next stage 328 the content of all arrays is encoded using one of known entropy encoding techniques, such as Huffman code known from: A. Huffman, "A Method for the Construction of Minimum-Redundancy Codes", Proceedings of the IRE, vol. 40, no. 9, pp. 1098-1101, September 1952, which returns an output compressed data sequence 115.

FIG. 4 shows a flowchart of a decoding method according to the invention, performed by a signal processing unit 211. In the first step, the entropy code decoder 411 decodes the transferred compressed data 115, reconstructing arrays of indices 324, 326 and arrays of values 325, 327 of the quantized transform coefficients. In the next step vectors of transform coefficients are initiated and pre-filled with zeros. In the reconstruction blocks 412, 413, the vectors' elements indicated by the decoded indices are filled with corresponding decoded non-zero coefficients values. In the next step, in blocks 414 and 415, the quantized coefficients values are scaled with the quantization step size used in the quantization units 320, 321 in order to restore the original dynamic range of the transform coefficients. Not encoded coefficients, ignored and discarded in the encoding process, are reconstructed using the "ACEnergy" parameter which is sent instead of them. This parameter determines the energy of all the coefficients that have not been selected in the encoding process. The missing coefficients are reconstructed in a random manner, while maintaining the selected coefficients' energy distribution. Usually the coefficients' energy distribution corresponds well to the Poisson distribution. Optionally, one can transfer an additional second parameter, ACEnvelope, indicating the type of envelope that approximates the energy distribution over the whole range of coefficients. Depending on the nature of the encoded signal, this parameter may indicate that the envelope corresponds to the exponential function, Gaussian function, or Poisson function.

The energy restoring unit operates with the AC coefficients of both the frequency trajectory and the amplitude trajectory. This introduces certain randomness to the signal—a noise that was lost in the encoding process. The energy distribution modelled with the Poisson/Gauss/exponential function corresponds to the shape of distribution occurring in the natural musical signals.

Next, the inverse transform 416, 417 is computed according to the formula:

$$\hat{x}_{log}(n,k) = v_n \Sigma_{m=0}^{N-1} \hat{X}(m,k) \psi_m(n),$$

where $\hat{X}(m,k)$ stands for the reconstructed value of quantized transform coefficient, $\hat{x}_{log}(n,k)$ is the reconstructed logarithmic value of signal frequency or the reconstructed logarithmic value of signal amplitude in the frame indicated by index n for the trajectory of the sinusoidal component indicated by k of the decoded signal in the current trajectory segment, $\psi_m(n)$ is the base function of the transform inverse to the one used in the encoding process, and $v_n$ is a normalization factor of the function. Encoding techniques with a use of a transform are widely known from the literature, e.g.: N. S. Jayant, P. Noll, "Digital Coding of Waveforms: Principles and Applications to Speech and Video", Prentice-Hall, 1984, and K. Sayood, "Introduction to Data Compression", Morgan Kaufmann, 2000. In the subsequent step reconstructed logarithmic values of frequency and amplitude are converted to the linear scale by means of antilogarithm 418, 419, according to the formula:

$$\hat{x}(n,k) = a^{\hat{x}_{log}(n,k)}.$$

In the above, a is the logarithm base used in the encoder, while $\hat{x}_{log}(n,k)$ is the reconstructed frequency value or the reconstructed amplitude value in the frame indicated by index n for the current segment of the sinusoidal trajectory describing the k-th component of the decoded signal. In the next step of decoding, the reconstructed trajectories' segments are merged in the blocks 420, 421 with the segments already decoded in order to recover the continuity of the trajectories' waveforms. The last decoding step is synthesis of the signal 214 described by the sinusoidal trajectories, the synthesis being performed in the block 422 with a use of techniques known from the literature, e.g.: R. J. McAulay, T. F. Quatieri, "Speech analysis/synthesis based on a sinusoidal representation", IEEE Transactions on Acoustics, Speech, and Signal Processing ASSP-34 (4), 1986.

FIG. 5 illustrates the trajectories in the encoded frames with a certain exemplary segment. Since coefficients obtained from the trajectories being the continuation of the trajectories encoded in the previous frames are outputted from the encoder first, there is no need for introducing beginning, end and continuation marks for all the trajectories in the frame. As a result, it is possible to reconstruct at the decoder the continuous trajectories using no signalling indicating beginning, continuation and end of the sinusoidal trajectory. This allows better compression to be achieved.

The disclosed invention allows significant reduction, by a factor of several times, of the number of bits required to encode the signal while maintaining good quality of the decoded signal at bit rates in the range of 8 kb/s-16 kb/s.

For the one skilled in the art it is clear that the invention may be practiced in many different ways and using different conventional devices. It is clear that various modifications of the embodiments of the invention using FPGA matrices, ASIC circuits, signal processors, and other typical components are within the scope of protection.

The invention claimed is:

1. An audio signal encoding method comprising the steps of:
    collecting audio signal samples,
    determining sinusoidal components in subsequent frames,
    estimation of value of amplitude and value of frequency of sinusoidal components in each frame,
    compression of the values of amplitude and the values of frequency to obtain output data, characterized in that compression of the values of the amplitudes of sinusoidal components and values of frequency of sinusoidal components includes steps of:
        forming rows of values of amplitudes of sinusoidal components determined in subsequent frames, wherein each row comprises values of amplitude of sinusoidal trajectory in subsequent frames, and forming rows of frequencies of sinusoidal components determined in subsequent frames to obtain sinusoidal trajectories, wherein each row comprises values of frequency of sinusoidal trajectory in subsequent frames, splitting particular trajectories into segments having individual lengths greater than one frame, representing the amplitudes of sinusoidal components and frequencies of sinusoidal components in logarithmic scale, by computing logarithms of amplitudes and frequencies for all frames of the segment, transforming rows of amplitudes of sinusoidal components represented in logarithmic scale over the segments to the frequency domain by means of orthogonal transform and transforming rows of frequencies of sinusoidal components represented in logarithmic scale over the segments to the frequency domain by means of orthogonal transform to obtain transform coefficients, quantization of the transform coefficients with quantization levels to obtain quantized transform coefficients, and selection in the segments of the quantized transform coefficients to be encoded and forming arrays of their indices and discarding the remaining quantized transform coefficients, entropy encoding of only selected quantized transform coefficients together with the arrays of their indices to obtain output data.

2. The method according to the claim 1 characterized in that, in the step of quantization, the quantization levels are selected individually for each trajectory.

3. The method according to the claim 2 characterized in that the quantization levels are adjusted in subsequent segments.

4. The method according to the claim 1 characterized in that entropy encoding of only selected quantized transform coefficients together with the arrays of their indices involves also and encoding at least one noise distribution parameter corresponding to total energy of discarded coefficients.

5. The method according to the claim 4, characterized in that, entropy encoding of only selected quantized transform coefficients together with the arrays of their indices and together with at least one noise distribution parameter involves also encoding of at least one additional noise parameter indicating the type of noise distribution.

6. The method according to the claim 1 characterized in that the individually adjusted length of the segments into which each trajectory is split is and determined in an optimization process, wherein minimization of output data rate is set as an optimization criterion.

7. The method according to claim 1 characterized in that a number of coefficients subjected to encoding with entropy code is selected individually in each segment.

8. The method according to claim 1 characterized in that the quantized coefficients are outputted in such a way that coefficients obtained from trajectories being a continuation of trajectories encoded in the previous groups of segments are outputted first.

9. An audio signal encoder comprising an analog-to-digital converter and a processing unit characterized in that processing unit is adapted to execute a method as defined in claim 1.

10. An audio signal decoding method comprising the steps of:

retrieving encoded data, decoding sinusoidal components from the encoded data synthesis of the audio signal from the sinusoidal components, characterized in that decoding includes entropy decoding of encoded quantized transform coefficients, array of their indices, reconstruction of vectors of quantized transform coefficients scaling quantized transform coefficients, subjecting the quantized transform coefficients to an inverse orthogonal frequency transform to obtain rows of amplitudes of sinusoidal components represented in logarithmic scale and rows of frequencies of sinusoidal components represented in logarithmic scale over a segment of sinusoidal trajectory, converting values of frequency and amplitude to back to linear scale with exponential operation, and reconstructing segments of trajectories merging newly decoded segments to segments decoded already to recover the continuity of the sinusoidal trajectories.

11. The method according to the claim 10, characterized in that it includes decoding of at least one noise parameter and before subjecting the quantized coefficients to an inverse transform it includes reconstruction of discarded quantized coefficients with noise generated on a basis of the at least one noise parameter.

12. The method according to the claim 11 characterized in that it includes decoding of additional parameter specifying distribution of noise used for reconstruction of discarded quantized coefficients with noise generated on a basis of the at least one noise parameter.

13. The method according to the claim 10, characterized in that, quantized transform coefficients corresponding to segments continued from segments reconstructed in previous groups of segments are outputted in the order of reconstruction of the segments of decoded in previous groups of segments.

14. An audio signal decoder, comprising a digital-to-analog converter and a processing unit characterized in that processing unit is adapted to execute a method as defined in claim 10.

* * * * *